United States Patent [19]

Toader

[11] Patent Number: 5,774,869

[45] Date of Patent: Jun. 30, 1998

[54] METHOD FOR PROVIDING SPONSOR PAID INTERNET ACCESS AND SIMULTANEOUS SPONSOR PROMOTION

[75] Inventor: Adrian Toader, Overland Park, Kans.

[73] Assignee: Interactive Media Works, LLC, Overland Park, Kans.

[21] Appl. No.: 471,337

[22] Filed: Jun. 6, 1995

[51] Int. Cl.[6] .................................................... G06F 17/40
[52] U.S. Cl. .............................................. 705/10; 705/14
[58] Field of Search .............................. 364/401; 705/10, 705/14

[56] References Cited

PUBLICATIONS

Bronson, Gail, "Message as medium—Free e–mail service will carry ads," Interactive Age, V.2, N.14, p. 49, May 8, 1995.
On–line Users Survey Results: Electronic Junk Mail–No; Bribes Maybe Interactive Facts Jun. 6, 1994 v1 No. 14.
"Keeping an eye on I/Pro: New Internet–user tracking services draws suspicion" Mediaweek Apr. 10, 1995.
"Compilers move to capture data online" Direct v7ns p. 22(1) May 1995.

Primary Examiner—Edward R. Cosimano
Assistant Examiner—Phillip Groutt
Attorney, Agent, or Firm—Litman, McMahon & Brown, LLC

[57] ABSTRACT

A method for promoting a sponsor's products by providing a consumer or potential consumer with sponsor-paid access to the Internet includes the step of distributing a floppy disc with Internet access software thereon. Associated with the floppy disc is a unique PIN number along with instructions on installing and using the Internet access software on a personal computer (PC). The Internet access software accesses and "handshakes" with an "Internet Entry Server", which verifies the PIN number, provides the access and times the sponsor paid Internet access time. In return, the Internet Entry Server performs as registration process which includes a number of personal questions and custom data gathering queries tailored by the sponsor for response by the user and initially gives the user a mandatory "guided tour" of the sponsor's Internet Home Page and domain where the user is exposed to current products and/or services of the sponsor and can download promotional coupons, product information, etc. The user is then released to browse the Internet and, after the free time is over, user paid refresh options are provided.

30 Claims, 2 Drawing Sheets

5,774,869

METHOD FOR PROVIDING SPONSOR PAID INTERNET ACCESS AND SIMULTANEOUS SPONSOR PROMOTION

BACKGROUND OF THE INVENTION

I. Field of The Invention

The present invention relates to a method for providing sponsor paid internet access and simultaneous sponsor promotion to a user, such as a consumer of the sponsor's products or services, for example. More particularly, the method includes the provision of sponsor promoted "giveaways" which include both software for accessing the Internet and a predetermined allotment of free Internet connect time. The accessing software is designed such that, as the user initially accesses the Internet, the sponsor's "home page" and domain is automatically accessed as well.

II. Description of The Related Art

In marketing of consumer products, particularly in the United States, it has long been common for manufacturers to use promotions in the form of discount coupons, sweepstakes, or other giveaways and contests. One object of such promotions is to develop a customer profile database which can yield valuable marketing information. Another object is to develop consumer mailing lists to identify customers who would be prime targets for promotional materials.

Traditionally, mail-in rebates have been one method of choice for developing such survey information and mailing lists. Such rebates are traditionally distributed by attaching refund offers directly to the product, or to display them alongside the product on a retail shelf, which refunds can be mailed into the manufacturer, along with a proof of purchase, to get a refund or rebate on the product. Some retail merchants provide a central bulletin board where all of the rebate forms are placed, requiring interested consumers to look through all of the forms to locate the one or ones in which they are interested. In addition to this time consuming search for relevant refund offers, there are several additional disadvantages of this rebate approach. Members of "discount or rebate clubs" will often take an entire booklet of refund forms from a display for trade or sale within the club, thus totally disrupting the manufacturer's promotional scheme. The rebate forms must be printed and distributed by the manufacturers to participating retailers, which represents a significant ongoing cost. Often manufacturers can supply only the largest retailers with refund forms, which diminishes the effectiveness of promotions and information gathering by virtually eliminating small merchants from the marketing effort. Consumers often do not know of the existence of the refund until he or she actually examines the product or the display in the store. Furthermore, since rebates are typically for nominal amounts, such as $0.25 or $0.50, for example, the postage costs to mail in these forms for a rebate are often prohibitive if the consumer is asked to bear them or, if the manufacturer uses prepaid postage, the postage will dramatically increase the promotional costs. The requirement to send in a proof of purchase, typically a store receipt, causes additional inconvenience. Finally, where it is important to collect consumer profile or mailing list information in a set time frame, the rebate coupons are returned to a manufacturer over a period of weeks, if not months. Once received, the information on the forms must be coded in by personnel at the manufacturer's collection facility, representing an added expense.

Recent advances in personal computer technology and the ever increasing percentage of the population with access to a personal computer have made the Internet a viable alternative marketing tool. Many on-line computer services, such as Prodigy and America On-Line, provide, for a fee as a part of their on-line service, software for connecting to and accessing the Internet. There are literally thousands of companies and organizations which maintain Internet/World Wide Web sites or "domains" which are accessible by users of the Internet. A problem with using such Web Sites and associated "Home Pages" as a marketing tool, is the huge number of options available to a user. In other words, without some incentive or direction for a user to access a particular company's home page, there is little likelihood that a particular user will access that home page, or even be aware of its existence.

It is apparent that a new marketing strategy and method is needed to take advantage of the Internet to provide a more desirable and convenient method of featuring a company's (sponsor's) products or services while providing a reliable source of consumer profile and mailing list information. Such a method should limit, or even eliminate, the requirement for printing and distributing rebate coupons and should allow sponsors an opportunity to feature, in real time, specific products or services. Finally, such a method should provide the potential for continued marketing access to the customers for additional promotions at minimal or no additional cost to the sponsor.

SUMMARY OF THE INVENTION

The present invention is a method for promoting a sponsor's products or services by providing a consumer or potential consumer with sponsor-paid access to the Internet for a limited time. The method includes the step of distributing, by mail, or in specially marked packages of the sponsor's products, a floppy disc with Internet access software thereon. Associated with the floppy disc is a unique personal identification number (PIN) along with instructions on installing and using the Internet access software on a personal computer (PC). The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time. Typically such a time period could be 30 minutes, for example, which is paid for by the sponsor. In return, the Internet Entry Server performs as registration process which includes a number of personal questions and custom data gathering in the form of queries provided by the sponsor for response by the user. The pertinent answers are then immediately provided to the sponsor. The Internet Entry Server also initially gives the user a mandatory "guided tour" of the sponsor's Home Page and domain where the user is exposed to any current product promotion by the sponsor and can download promotional coupons, product information, etc. After this mandatory guided tour is completed, the user is allowed to access any other information on the Internet. The Internet Entry Server also tracks the locations visited by the user during the allotted time period, which information is also provided to the sponsor. The other sites visited can also provide valuable marketing data for the sponsor. Finally, once the "free" time period is up, the Internet Entry Server prompts the user with one or more of a plurality of options for extending the access period. For example, the user can be prompted to enter a credit card number to which access time will be charged; he or she can be given the opportunity to answer additional survey information in return for additional "free" time; or a 900 subscriber paid telephone access number can be provided through which additional access will be billed via the normal telephone company 900 billing cycles.

OBJECTS AND ADVANTAGES OF THE INVENTION

The principle objects and advantages of the invention include: to provide an improved method of featuring a sponsor's products or services by providing "free" Internet access time to a participating consumer or "user"; to provide such an improved method in which the user is given Internet access software for a PC which interfaces the PC with an Internet Entry Server to provide access to the Internet; to provide such a method in which a unique PIN number is associated with the access software, which PIN number entitles the user to the free Internet access time; to provide such a method in which the Internet Entry Server prompts the user, upon initial dial-up, to register by answering a series of queries provided by the sponsor; to provide such a method in which the user, once the queries are answered, is given a mandatory "guided tour" of the sponsor's home page and domain prior to being given general "browsing" access to the Internet; to provide such a method in which any browsing done by the user is also monitored and reported back to the sponsor for additional marketing information; to provide such a method in which, when the initial allotted free time is used up, the user is given one or more options to acquire additional Internet access time; and to provide such a method which achieves effective exposure and marketing of a sponsor's products or services with minimal expense.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
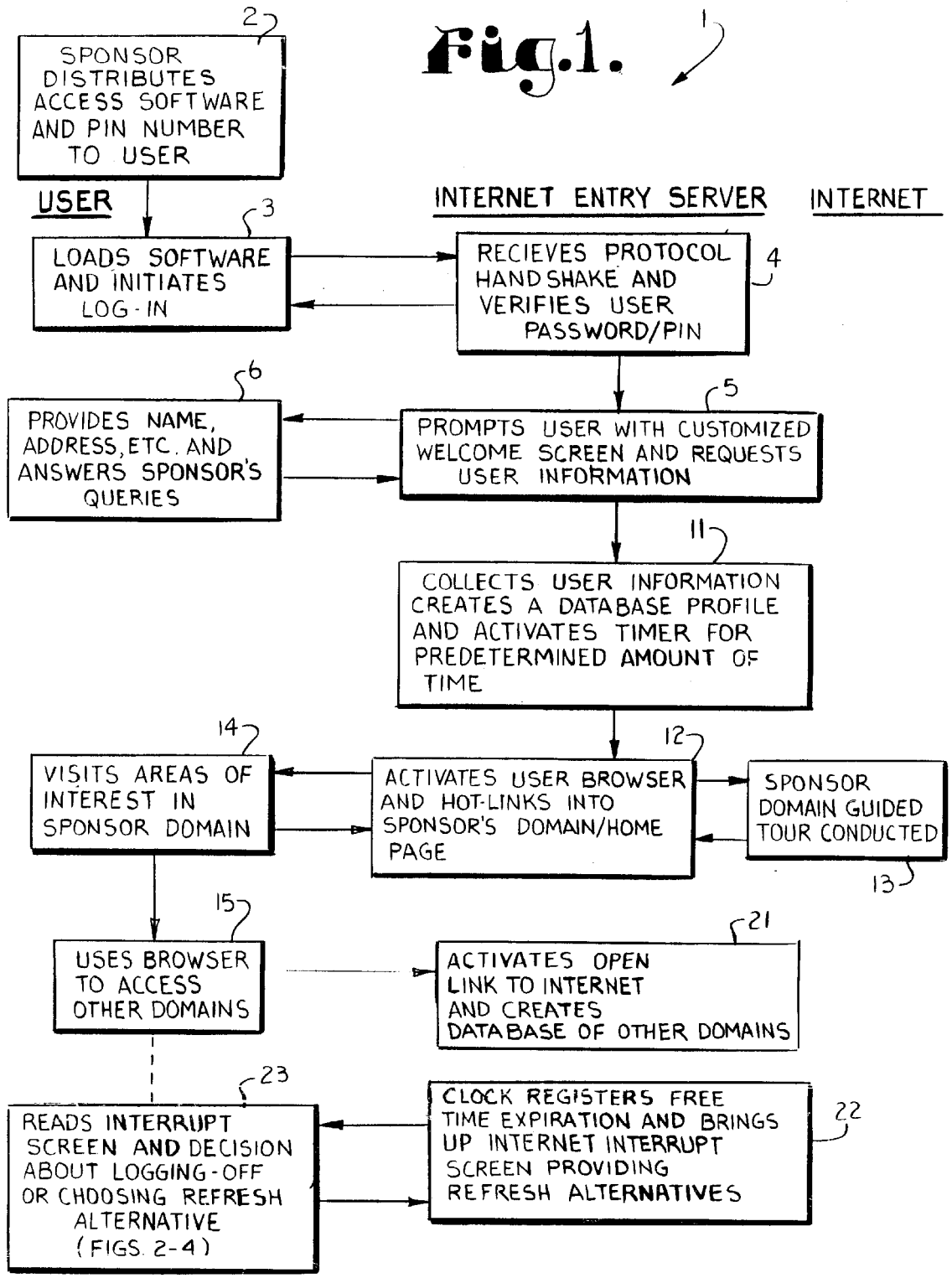
FIG. 1 is a schematic block diagram of a method of providing sponsor paid Internet access time while collecting marketing data and featuring the sponsor's products and/or services.

Referring to FIG. 1, the numeral 1 generally refers to a method of providing a consumer or user with a sponsor-paid Internet access time allotment while collecting marketing data for the sponsor and featuring the sponsor's products and/or special services.

At block 2, the sponsor provides the user with Internet access software and a PIN number which authorizes the user to access the Internet for the allotted time period. Distribution can be accomplished in a number of ways, including, but not limited to placing program floppy discs, instructions and PIN numbers in specially marked packages of a sponsor's product, providing a toll free number which users can call to receive a package including the floppy and PIN number, and/or distributing packages through retail outlets which sell the sponsor's products. At block 3, the user installs the program on his or her PC and initiates the toll free call and log-in procedure to the Internet Entry Server (IES) via the PC's modem. At block 4, the IES receives the protocol handshake automatically entered by the PC and verifies the user's PIN number. At block 5, the IES prompts the user with a customized "welcome" screen which preferably features the sponsor's logo and other sponsor supplied information. At this point, the user is requested to register by supplying answers to queries, including typical questions such as name, address, age, gender, etc. as well as sponsor supplied specialized survey queries. At block 6, the user provides answers to the questions, wherein, at block 11, the IES collects the information and compiles a database profile for this user, forwards the profile to the sponsor, and activates a timer to time the user's Internet access.

At block 12, the IES activates an Internet navigational software "browser" program on the user's PC. Such browser programs are widely available, and include titles such as Netscape, Mosaic, etc. The IES directs the browser program to directly connect (hot-link) the user to the Internet domain/ Home Page of the sponsor, signified by block 13. At block 13, the user is conducted through a mandatory "guided tour" of the sponsors domain where he or she is exposed to any promotional information, coupon retrieval options, etc., which the sponsor wants to feature. After the sponsor domain guided tour, at block 14, the IES returns control to the user who is now free to visit other areas of interest within the sponsor's domain and then, at block 15, the user is released to visit other domains or areas of interest within the Internet for the remaining time of the sponsor paid allotment. At block 21, the IES provides an open link to the Internet for the remainder of the time period and also keeps a record of other domains visited by the user until the IES clock, at block 22, times out the initial period and brings up a predefined informational screen to the user, again preferably featuring the sponsor's logo and identifying information. On this informational screen, one or more alternatives (FIGS. 2–4) are provided to the user to extend or "refresh" the Internet access time. At block 23, the user reads the informational interrupt screen and makes a decision about logging off or refreshing his allotted time period.

Figure 2:
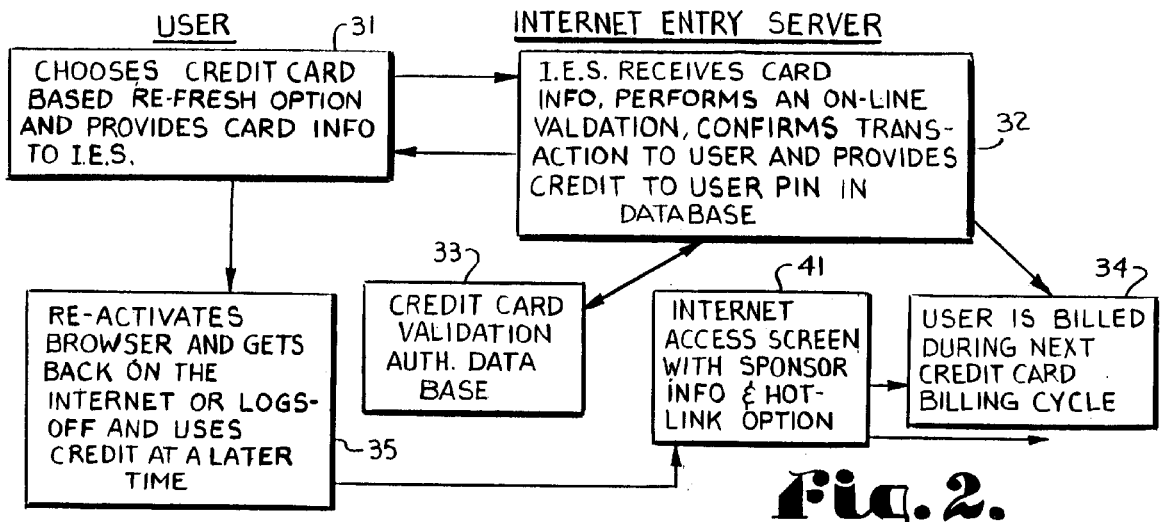
FIG. 2 is a schematic block diagram of a first option for extending a user's access to the Internet past the sponsor paid access time allotment.

Referring to FIG. 2, a block diagram of a first option for refreshing the Internet time allotment is illustrated. In this option, the user can give a credit card number to which additional Internet access time will be billed via the normal IES billing procedure. At block 31, the user chooses the credit card option from a menu of refresh options and provides his or her credit card information as well as a time purchase to the IES. At block 32, the IES receives the credit card information, performs an on-line validation from a credit card validation database (block 33), provides confirmation to the user and credits the user's PIN account with the additional time. At block 34, the user is billed during the normal credit card billing cycle. At block 35, the user reactivates the browser program and continues the Internet access or logs off and reserves the purchased time for later use. At block 41, each time the user reactivates the Internet browser program, a screen is presented which features the sponsor's logo or other identifying data and an option to hot-link to the sponsor's domain, possibly for no charge during the sponsor domain access.

Figure 3:
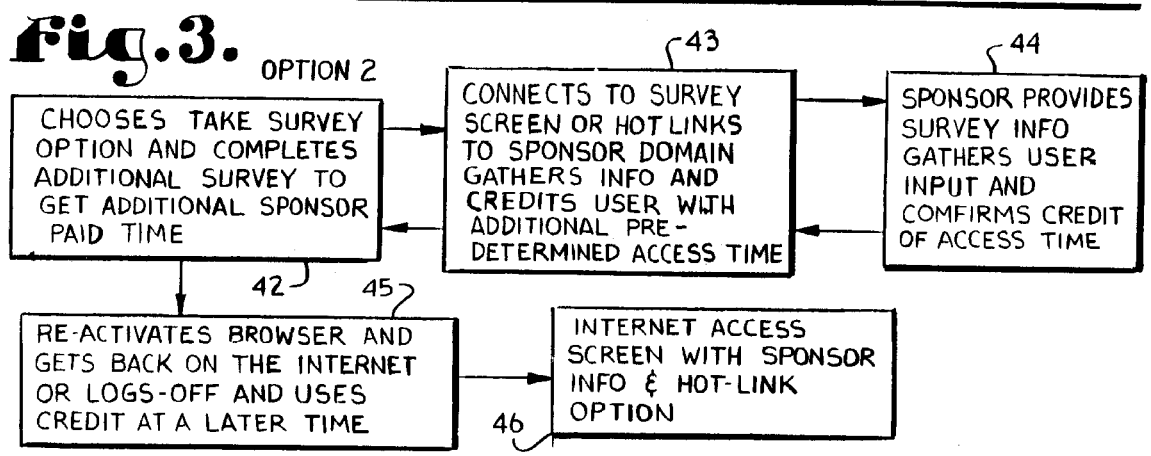
FIG. 3 is a schematic block diagram of a second option for extending a user's access to the Internet past the sponsor paid access time allotment.

FIG. 3 illustrates a block schematic diagram of a second option for refreshing the user's Internet time allotment. In this option, the user can take an additional "survey", answering additional questions and/or providing further information solicited by the sponsor, and, in return, receives an additional sponsor paid Internet time allotment. At block 42, the user chooses the Survey refresh option and, at block 43, the IES connects the user to a survey screen or, at block 44, hot-links the user to the sponsor domain where the user interactively provides the required information. Once the additional survey is complete, the sponsor, again at block 44, authorizes the additional Internet connect time allotment to the user. At block 45, the user reactivates the browser program and reaccesses the Internet or logs off and reserves the additional time for later use. At block 46, as in block 41 in FIG. 2, each time the user logs on, a sponsor tailored information screen is displayed with sponsor hot-link options.

Figure 4:
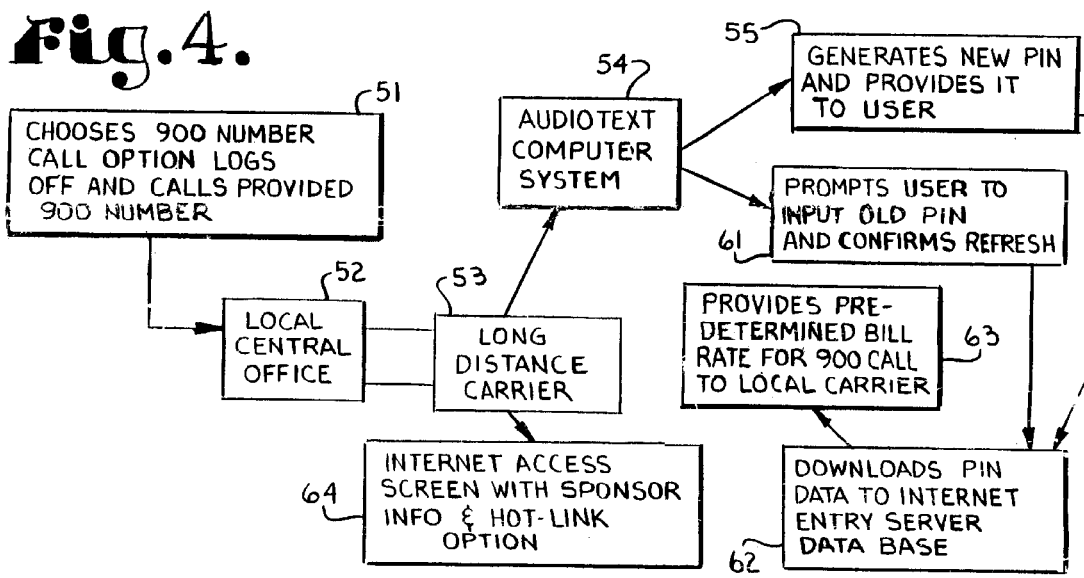
FIG. 4 is a schematic block diagram of a third option for extending a user's access to the Internet past the sponsor paid access time allotment.

FIG. 4 illustrates a block schematic diagram of a third option for refreshing the user's Internet time allotment. In this option, the user can access the IES via a "900" subscriber pay number where Internet access time will be billed through the user's telephone company 900 billing procedures. At block 51, the 900 number option is selected, whereupon the user logs off and, either immediately or at a future time, calls the assigned 900 number, using a touch-tone telephone. The 900 call proceeds through normal call channels including, at blocks 52 and 53,respectively, the user's local central office and long distance carrier, terminating at an IES linked audiotext computer system at block 54. At block 55 the IES assigns a new PIN number, or, alternatively, at block 61, prompts the entry of the old, originally assigned PIN number. At block 62, the PIN information is used to open a new account. Finally, at block 63, billing is done via normal long distance carrier and/or telephone company 900 billing procedures at a billing rate provided by the IES. Subsequent to access time being credited to user, he logs on via new or refreshed PIN. At block 64, Internet access screens are provided which preferably include the sponsor's logo or other information and a hot-link option to access the sponsor's domain with each log-on by the user. Again, the time consumed by the user in visiting the sponsor's domain can be provided free of charge.

It is to be understood that while certain forms of the present invention have been illustrated and described herein, it is not to be limited to the specific forms or arrangement of parts described and shown.

What is claimed and desired to be secured by Letters Patent is as follows:

1. A method of providing a sponsor paid Internet connect time allotment to a user while simultaneously collecting survey data for the sponsor comprising the steps of:
   a. distributing sponsor provided Internet access software to the user;
   b. providing a PIN number to the user which PIN number entitles the user to log on to an Internet Entry Server via said sponsor provided software;
   c. prompting the user to answer a series of queries, with the answers forming said survey data as the user logs on to the Internet Entry Server via said sponsor provided software; and
   d. allowing the user to access the Internet for a predetermined time via said sponsor provided software and said Internet Entry Server once the user has responded to all of the queries.

2. A method as in claim 1, and further comprising the step of:
   a. providing said user with one or more options to extend the Internet access time after said predetermined time period has expired.

3. A method as in claim 2, and further including the step of:
   a. displaying an initial display screen each time the user accesses the Internet via said Internet Entry Server which display screen includes sponsor related displays or other sponsor related information.

4. A method as in claim 3, and further wherein:
   a. said initial display screen includes instructions on selecting a hot link to the sponsor Internet domain.

5. A method as in claim 4, and further wherein:
   a. access time during the hot link to the sponsor domain is paid for by the sponsor.

6. A method as in claim 2, and further wherein:
   a. said options to extend include providing a credit card number to which further Internet access time can be charged.

7. A method as in claim 2, and further wherein:
   a. said options to extend include answering further survey questions in return for an extension of the sponsor paid Internet access time.

8. A method as in claim 2, and further wherein:
   a. said options to extend include a 900 call service whereby said user accesses said Internet Entry Server after calling a subscriber paid 900 telephone number for further Internet access time.

9. A method as in claim 1, and further comprising the step of:
   a. initially hot linking said user to an Internet domain or Home Page of the sponsor upon initial Internet access.

10. A method as in claim 9, and further comprising the step of:
    a. conducting said user through a guided tour of the sponsor's Internet domain; and
    b. allowing said user to browse other Internet domains only after said guided tour is concluded.

11. A method as in claim 10, and further comprising the step of:
    a. keeping a record of the said other Internet domains accessed by said user after said guided tour is concluded.

12. A method of providing a sponsor paid Internet connect time allotment to a user while simultaneously collecting survey data for the sponsor comprising the steps of:
    a. distributing sponsor provided Internet access software to the user;
    b. providing a PIN number to the user which PIN number entitles the user to log on to an Internet Entry Server via said sponsor provided software;
    c. prompting the user to answer a series of queries, with the answers forming said survey data as the user logs on to the Internet Entry Server via said sponsor provided software;

d. allowing the user to access the Internet for a predetermined time period via said sponsor provided software and said Internet Entry Server once the user has responded to all of the queries; and e. initially hot linking said user to an Internet domain or Home Page of the sponsor upon initial Internet access.

13. A method as in claim 12, and further comprising the step of:

a. providing said user with one or more options to extend the Internet access time after said predetermined time period has expired.

14. A method as in claim 13, and further including the step of:

a. displaying an initial display screen each time the user accesses the Internet via said Internet Entry Server which display screen includes sponsor related displays or other sponsor related information.

15. A method as in claim 14, and further wherein:

a. said initial display screen includes instructions on selecting a hot link to the sponsor Internet domain.

16. A method as in claim 15, and further wherein:

a. access time during the hot link to the sponsor domain is paid for by the sponsor.

17. A method as in claim 13, and further wherein:

a. said options to extend include providing a credit card number to which further Internet access time can be charged.

18. A method as in claim 13, and further wherein:

a. said options to extend include answering further survey questions in return for an extension of the sponsor paid Internet access time.

19. A method as in claim 13, and further wherein:

a. said options to extend include a 900 call service whereby said user accesses said Internet Entry Server after calling a subscriber paid 900 telephone number for further Internet access time.

20. A method as in claim 12, and further comprising the step of:

a. conducting said user through a guided tour of the sponsor's Internet domain; and b. allowing said user to browse other Internet sites only after said guided tour is concluded.

21. A method as in claim 20, and further comprising the step of:

a. keeping a record of the said other Internet domains accessed by said user after said guided tour is concluded.

22. A method of providing a sponsor paid Internet connect time allotment to a user while simultaneously collecting survey data for the sponsor comprising the steps of:

a. distributing sponsor provided Internet access software to the user;

b. providing a PIN number to the user which PIN number entitles the user to log on to an Internet Entry Server via said sponsor provided software;

c. prompting the user to answer a series of queries, with the answers forming said survey data as the user logs on to the Internet Entry Server via said sponsor provided software;

d. initially hot linking said user to an Internet domain or Home Page of the sponsor via said sponsor provided software and said Internet Entry Server upon initial Internet access;

e. conducting said user through a guided tour of the sponsor's Internet domain; and f. allowing said user to browse other Internet sites via said sponsor provided software and said Internet Entry Server only after said guided tour is concluded.

23. A method as in claim 22, and further comprising the step of:

a. providing said user with one or more options to extend the Internet access time after said predetermined time period has expired.

24. A method as in claim 23, and further including the step of:

a. displaying an initial display screen each time the user accesses the Internet via said Internet Entry Server which display screen includes sponsor related displays or other sponsor related information.

25. A method as in claim 24, and further wherein:

a. said initial display screen includes instructions on selecting a hot link to the sponsor Internet domain.

26. A method as in claim 25, and further wherein:

(a) access time during the hot link to the sponsor domain is paid for by the sponsor.

27. A method as in claim 23, and further wherein:

a. said options to extend include providing a credit card number to which further Internet access time can be charged.

28. A method as in claim 23, and further wherein:

a. said options to extend include answering further survey questions in return for an extension of the sponsor paid Internet access time.

29. A method as in claim 23, and further wherein:

a. said options to extend include a 900 call service whereby said user accesses said Internet Entry Server after calling a subscriber paid 900 telephone number for further Internet access time.

30. A method as in claim 22, and further comprising the step of:

a. keeping a record of the said other Internet domains accessed by said user after said guided tour is concluded.

* * * * *